(12) United States Patent
Zhang et al.

(10) Patent No.: US 12,474,574 B2
(45) Date of Patent: Nov. 18, 2025

(54) ENCODED ILLUMINATION REAL-TIME FOCUSING SCANNING IMAGING DEVICE AND METHOD

(71) Applicant: Tsinghua Shenzhen International Graduate School, Guangdong (CN)

(72) Inventors: Yongbing Zhang, Guangdong (CN); Kaifa Xin, Guangdong (CN); Xiangyang Ji, Guangdong (CN); Haoqian Wang, Guangdong (CN)

(73) Assignee: TSINGHUA SHENZHEN INTERNATIONAL GRADUATE SCHOOL, Guangdong (CN)

( * ) Notice: Subject to any disclaimer, the term of this patent is extended or adjusted under 35 U.S.C. 154(b) by 397 days.

(21) Appl. No.: 18/304,168

(22) Filed: Apr. 20, 2023

(65) Prior Publication Data

US 2023/0266584 A1    Aug. 24, 2023

Related U.S. Application Data

(63) Continuation of application No. PCT/CN2021/117552, filed on Sep. 10, 2021.

(30) Foreign Application Priority Data

Nov. 4, 2020 (CN) .......................... 202011215791.1

(51) Int. Cl.
*G02B 27/00* (2006.01)
*G02B 7/09* (2021.01)
(Continued)

(52) U.S. Cl.
CPC ........... *G02B 27/0031* (2013.01); *G02B 7/09* (2013.01); *G06T 7/269* (2017.01); *H04N 23/74* (2023.01); *H10H 29/14* (2025.01)

(58) Field of Classification Search
CPC ...... G02B 27/0031; G02B 7/09; G06T 7/269; H04N 23/74; H04N 23/67; H10H 29/14; G06K 7/14
(Continued)

(56) References Cited

U.S. PATENT DOCUMENTS

| 2008/0097143 A1* | 4/2008 | Califorrniaa ......... A61B 17/435 600/22 |
| 2009/0021818 A1* | 1/2009 | Weir .................... A61B 5/0062 359/224.1 |

(Continued)

FOREIGN PATENT DOCUMENTS

| CN | 105158887 A | 12/2015 |
| CN | 205920270 U | 2/2017 |

(Continued)

OTHER PUBLICATIONS

International Search Report (with English translation) and Written Opinion issued in PCT/CN2021/117552, dated Nov. 17, 2021, 9 pages provided.

*Primary Examiner* — Edwyn Labaze
(74) *Attorney, Agent, or Firm* — HSML P. C.

(57) ABSTRACT

An encoded illumination real-time focusing scanning imaging device includes an LED array, an object stage, an objective lens, a liquid lens, a lens sleeve, and a camera. The object stage is used for placing a sample, the LED array is used for emitting bright field light or encoded light, and the bright field light or the encoded light respectively penetrates through the sample and then successively passes through the objective lens, the liquid lens, and the lens sleeve to reach the camera to shoot a bright field image or an encoded light illumination image by the camera. The present invention also discloses an encoded illumination real-time focusing scanning imaging method, which is performed by using the above-mentioned device. The present invention enables fast and accurate focusing at a low cost.

8 Claims, 2 Drawing Sheets

(51) Int. Cl.
    *G06T 7/269* (2017.01)
    *H04N 23/74* (2023.01)
    *H10H 29/14* (2025.01)

(58) Field of Classification Search
    USPC .................................. 235/454, 462.42, 375
    See application file for complete search history.

(56) References Cited

U.S. PATENT DOCUMENTS

| | | |
|---|---|---|
| 2014/0029102 A1 | 1/2014 | Zalevsky et al. |
| 2015/0037750 A1 | 2/2015 | Moalem |

FOREIGN PATENT DOCUMENTS

| | | | |
|---|---|---|---|
| CN | 106772982 A | | 5/2017 |
| CN | 106937107 A | | 7/2017 |
| CN | 107065159 A | | 8/2017 |
| CN | 108490596 A | | 9/2018 |
| CN | 109407297 A | | 3/2019 |
| CN | 110727093 A | | 1/2020 |
| CN | 111462026 A | | 7/2020 |
| CN | 111504177 A | | 8/2020 |
| CN | 111629147 A | | 9/2020 |
| CN | 111812833 A | | 10/2020 |
| CN | 112367447 A | | 2/2021 |

\* cited by examiner

ENCODED ILLUMINATION REAL-TIME FOCUSING SCANNING IMAGING DEVICE AND METHOD

CROSS REFERENCE TO RELATED APPLICATIONS

This application is a continuation application of PCT/CN2021/117552, which claims priority to CN patent application NO. 202011215791.1 filed on 2020 Nov. 4. The contents of the above-mentioned applications are all hereby incorporated by reference.

TECHNICAL FIELD

The present invention relates to the technical field of imaging, and more particularly to an encoded illumination real-time focusing scanning imaging device and method.

BACKGROUND ART

In 2017, Philips' wsi (whole slide imaging) system was certified by FDA (Food and Drug Administration) for clinical diagnosis, marking the feasibility of digital pathology in clinical medicine applications. The whole slide imaging digitizes and stores a pathological section in a computer for easy storage and review. Advances in this technology can greatly drive the development of digital pathology. In order to acquire a high-resolution image, a high numerical aperture objective lens is needed in the process of whole slide image acquisition, so that the depth of field of the system is very small. Correct focusing so that the system is within the range of depth of field is an important factor in acquiring a clear whole slide image.

The traditional focusing mode is based on the z-stack mode, taking a large number of pictures in the z-axis range and selecting one with the highest image quality as the quasi-focal image, but this mode requires a lot of time expenditure. In addition, focusing is also performed based on a focusing map mode, and the quasi-focal position is acquired through stacking in a part of a field of view of a sample, and the quasi-focal position of the whole field of view of the sample is obtained through interpolation. However, this method requires additional time to acquire the focusing map. There is also a way of focusing based on reflection mode to determine the defocusing amount by detecting the position of the reflected laser light of the sample. But this method requires an additional device and increases the cost.

The additional time expenditure or additional hardware equipment requirement in the above methods affects the promotion of the wsi in clinical applications.

The disclosure of the content in the above background art is only used to assist in understanding the concept and technical solution of the present invention, and it does not necessarily belong to the prior art of the present patent application. In the absence of clear evidence indicating that the above content has been disclosed on the application date of the present patent application, the above background art should not be used to evaluate the novelty and inventiveness of the present application.

SUMMARY OF THE INVENTION

In order to solve the above technical problem, the present invention proposes an encoded illumination real-time focusing scanning imaging device and method, which can achieve fast and accurate focusing at low cost.

In order to achieve the above object, the invention adopts the following technical solutions.

One embodiment of the present invention discloses an encoded illumination real-time focusing scanning imaging device, including an LED array, an object stage, an objective lens, a liquid lens, a lens sleeve, and a camera. The LED array is located on one side of the object stage, the objective lens, the liquid lens, the lens sleeve, and the camera are located on the other side of the object stage, the object stage is used for placing a sample, the LED array is used for emitting bright field light or encoded light, and the bright field light or the encoded light respectively penetrates through the sample and then successively passes through the objective lens, the liquid lens, and the lens sleeve to reach the camera to shoot a bright field image or an encoded light illumination image by the camera.

Preferably, the bright field light is obtained by emitting white light through all LEDs on the LED array.

Preferably, the encoded light is obtained by two LEDs located on two sides of the sample on the LED array respectively emitting light of different wavelengths and the other LEDs not emitting light. The present invention also discloses an encoded illumination real-time focusing scanning imaging method, comprising steps below:

S1: setting up the encoded illumination real-time focusing scanning imaging device according to any of claims 1-3;

S2: placing a sample to be tested on the object stage so that the objective lens aligns with any spatial position of the sample, adjusting a current of the liquid lens at the spatial position with a predetermined step length, respectively shooting the bright field image and the encoded light illumination image under each current value, and calculating the defocusing amount of each bright field image so as to obtain a corresponding defocusing amount of each encoded light illumination image;

S3: taking multiple encoded light illumination images and corresponding defocusing amounts as an input and an output of a convolutional neural network respectively so as to train the convolutional neural network; and S4: shooting the encoded light illumination image, inputting the same to a trained convolutional neural network so as to obtain the corresponding defocusing amount, and adjusting the current of the liquid lens according to the corresponding defocusing amount so as to shoot and obtain a quasi-focal bright field image.

Preferably, in step S2, prior to shooting a bright field image and an encoded light illumination image, the encoded illumination real-time focusing scanning imaging device is calibrated to obtain a proportional relationship between a current value change of the liquid lens and a z-axis displacement. Preferably, calculating the defocusing amount of each bright field image specifically comprises: calculating a brenner gradient of each bright field image, determining a quasi-focal position by fitting a quadratic function with a reciprocal of brenner gradient, and combining the quasi-focal position and the proportional relationship between the current value change of the liquid lens and the z-axis displacement to calculate the defocusing amount of each bright field image.

Preferably, the predetermined step length in step S2 is 0.5 µm.

Preferably, in step S3, the encoded light illumination image within a defocusing amount range of ±20 µm near a quasi-focal point and a corresponding defocusing amount are specifically selected as the input and the output of the convolutional neural network, respectively.

Preferably, step S4 specifically comprises:

S41: placing the sample to be tested on the object stage such that the objective lens is aligned with a spatial position of the sample;

S42: the LED array emitting encoded light to shoot the encoded light illumination image;

S43: inputting the encoded light illumination image shot in step S42 into the trained convolutional neural network so as to obtain the corresponding defocusing amount;

S44: adjusting the current of the liquid lens according to the corresponding defocusing amount so that an optical path system of the encoded illumination real-time focusing scanning imaging device is in a quasi-focal position;

S45: the LED array emitting bright field light so as to shoot and obtain the bright field image of the quasi-focal position; and S46: controlling the object stage so that the objective lens is aligned with the next spatial position of the sample, and repeating steps S41-S45 until images of all spatial positions of the sample are acquired, and then all bright field images are spliced into a whole slide image.

The present invention also discloses an encoded illumination real-time focusing scanning imaging system, comprising:

an encoded illumination real-time focusing scanning imaging device, the encoded illumination real-time focusing scanning imaging device comprising an LED array, an object stage, an objective lens, a liquid lens, a lens sleeve, and a camera, wherein the LED array is located on one side of the object stage, the objective lens, the liquid lens, the lens sleeve, and the camera are located on the other side of the object stage, the object stage is used for placing a sample, the LED array is used for emitting bright field light or encoded light, and the bright field light or the encoded light respectively penetrates through the sample and then successively passes through the objective lens, the liquid lens, and the lens sleeve to reach the camera to shoot a bright field image or an encoded light illumination image by the camera, the encoded light being obtained by two LEDs located on two sides of the sample on the LED array respectively emitting light of different wavelengths and the other LEDs not emitting light; wherein a sample to be tested is placed on the object stage such that the objective lens is aligned with any spatial position of the sample;

and a processor for executing a computer-readable instruction that, when executed by the processor, executes the steps below:

adjusting a current of the liquid lens at the spatial position with a predetermined step length, respectively shooting the bright field image and the encoded light illumination image under each current value, and calculating the defocusing amount of each bright field image so as to obtain a corresponding defocusing amount of each encoded light illumination image;

taking multiple encoded light illumination images and corresponding defocusing amounts as an input and an output of a convolutional neural network respectively so as to train the convolutional neural network; and inputting a shot encoded light illumination image to a trained convolutional neural network so as to obtain the corresponding defocusing amount, and adjusting the current of the liquid lens according to the corresponding defocusing amount so as to shoot and obtain a quasi-focal bright field image.

Compared with the prior art, the advantageous effects of the present invention are as follows: the encoded illumination real-time focusing scanning imaging device proposed by the present invention includes an LED array and a liquid lens, wherein bright field light or encoded light is emitted through the LED array so as to respectively capture a bright field image or an encoded light illumination image, and wherein the captured encoded light illumination image can be used for training a convolutional neural network; further combining with a liquid lens with a fast adjustment capability, multiple groups of bright field images and encoded light illumination images can be conveniently acquired, and the defocusing amount of the bright field image is correspondingly calculated so as to acquire the training data of the convolutional neural network; through the trained convolutional neural network, the defocusing amount of the encoded illumination image shot by the encoded illumination real-time focusing scanning imaging device can be quickly obtained, so that the liquid lens can be quickly adjusted according to the defocusing amount to obtain the quasi-focal bright field image, and finally obtain the whole slide high-resolution image. In summary, the present invention, by using encoded light illumination, enables the obtained encoded light illumination image to contain the information about the defocusing amount, and uses depth learning to calculate the defocusing amount, and uses a liquid lens to accelerate the focusing speed during the image acquisition process, thereby greatly improving the acquisition speed of a whole slide pathological image, and achieving the implementation of fast and accurate focusing at low cost.

DETAILED DESCRIPTION OF THE INVENTION

The present invention will be further described below with reference to the accompanying drawings and in combination with preferred implementation modes.

In order to acquire a high-resolution image, a high NA (numerical aperture) objective lens is used during the acquisition of a whole slide pathological image, so the depth of field of the system is very small. Therefore, correct focusing on each field of view is the main factor affecting the quality of whole slide image acquisition. The present invention combines depth learning with encoded light illumination for fast calculation of defocusing amount during the whole slide image acquisition.

Figure 1:
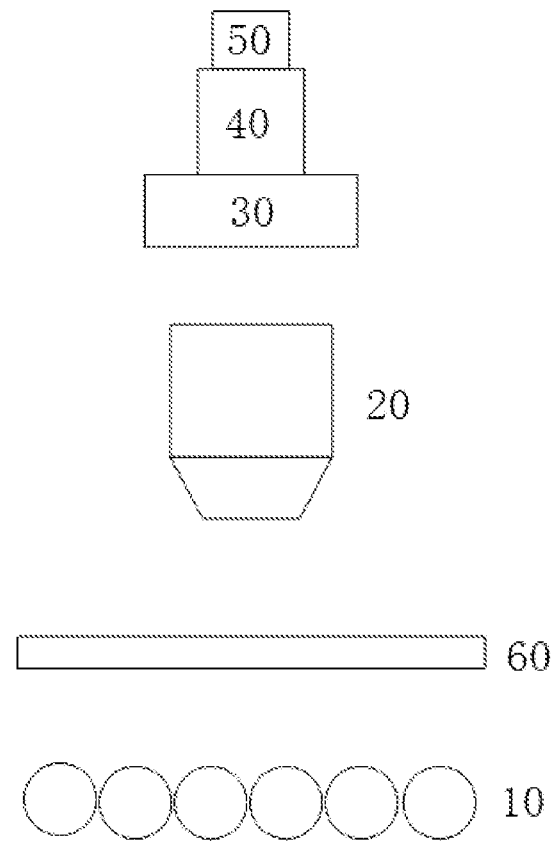
FIG. 1 is a structural diagram of an encoded illumination real-time focusing scanning imaging device according to a preferred embodiment of the present invention.

As shown in FIG. 1, a preferred embodiment of the present invention discloses an encoded illumination real-time focusing scanning imaging device, comprising an LED array 10, an object stage (not shown), an objective lens 20, a liquid lens 30, a lens sleeve 40, and a camera 50. The LED array 10 is placed on one side of the object stage, and the objective lens 20, the liquid lens 30, the lens sleeve 40, and the camera 50 are placed on the other side of the object stage. A sample 60 to be observed is placed on the object stage, wherein the optical path of the system is as follows: the light emitted by the LED array 10 transmits through the sample 60, then is magnified through the objective lens 20, and then successively passes through the liquid lens 30 and the lens sleeve 40, and then reaches the camera 50. When the LED array 10 as a whole emits white light, a bright field image can be acquired via the camera 50; when two LEDs located on two sides of the sample on the LED array 10 emit light of different wavelengths, and the other LEDs do not emit light, an encoded light illumination image can be acquired by the camera 50. When the encoded light illumination image is acquired, since the positions of two LEDs are located on two sides of the sample, when the current sample is in a non-quasi-focal state, a displacement relationship exists between image channels acquired by a color camera, and the current defocusing amount can be acquired by obtaining the displacement relationship; the liquid lens can change the focal length by adjusting the magnitude of current, so the quasi-focal state can be achieved by adjusting the magnitude of current of the liquid lens.

Specifically, when a sample is illuminated from two spatial positions with two different wavelengths of light (e.g. using green and blue light), there is no displacement between the green channel and blue channel of the acquired image if the sample is in a quasi-focal position, and there is a displacement between the green channel and blue channel of the acquired image if the sample is not in the quasi-focal position, and the magnitude of the displacement is related to the defocusing amount. This rule provides information for calculating the defocusing distance. The following encoded illumination real-time focusing scanning imaging method uses a convolutional neural network to extract the information of displacement and defocusing amount between two channels, so as to realize the rapid judgment of the defocusing amount in the image acquisition process, and quickly correct it to the quasi-focal position through the liquid lens.

Figure 2:
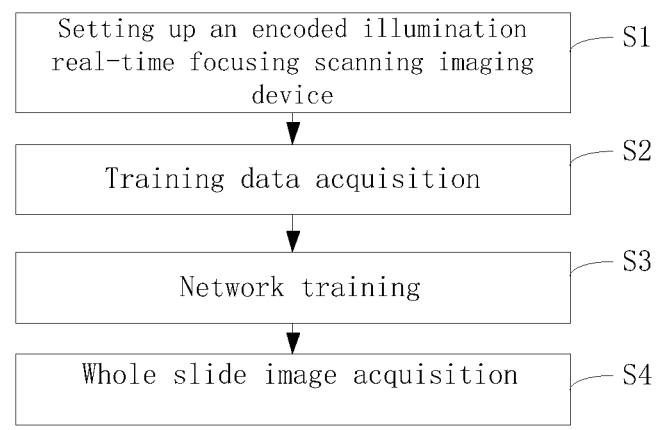
FIG. 2 is a schematic flow diagram of an encoded illumination real-time focusing scanning imaging method according to a preferred embodiment of the present invention.

As shown in FIG. 2, a preferred embodiment of the present invention further discloses an encoded illumination real-time focusing scanning imaging method based on the above-mentioned encoded illumination real-time focusing scanning imaging device, comprising the following steps.

S1: set up the above-mentioned encoded illumination real-time focusing scanning imaging device.

S2: training data acquisition.

Figure 3:
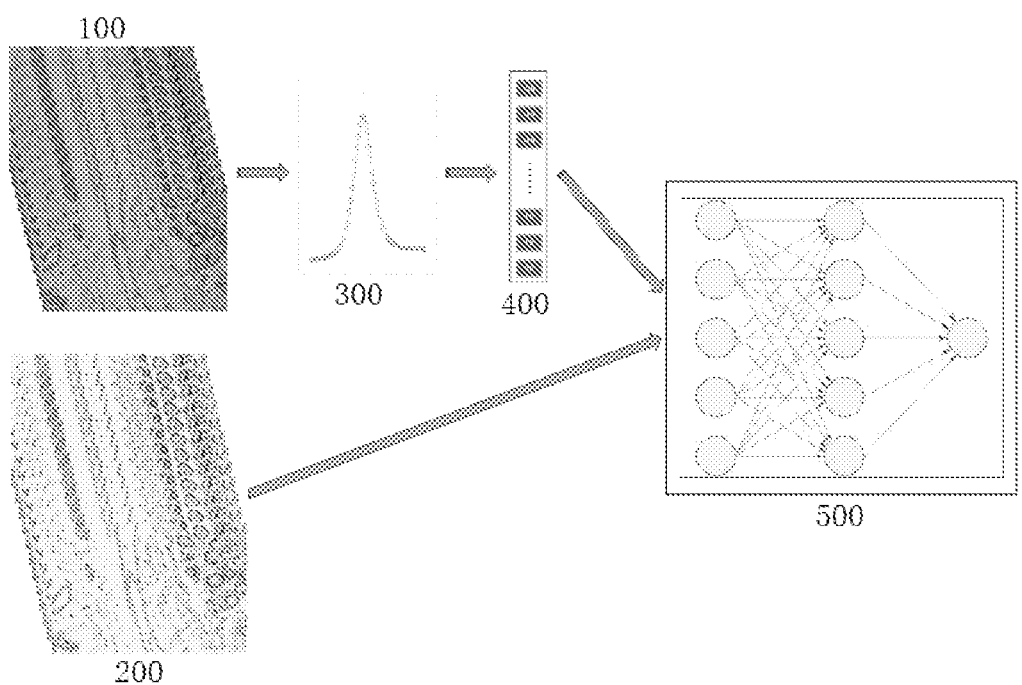
FIG. 3 is a schematic diagram of training data acquisition for a convolutional neural network in an encoded illumination real-time focusing scanning imaging method according to a preferred embodiment of the present invention.

The diopter of the liquid lens is positively related to the magnitude of current input into the liquid lens; the adjustment of the diopter of the liquid lens is equivalent to the movement of the objective lens in the z-axis, so in an embodiment of the present invention, the mechanical movement of the z-axis objective lens is replaced by adjusting the liquid lens; compared with moving the objective lens mechanically on the z-axis, the liquid lens has the advantages of fast adjustment speed and no mechanical vibration, and is more suitable for fast acquisition of a whole slide image. The liquid lens is calibrated before data collection to acquire the proportional relationship between the liquid lens current variation quantity and the objective lens z-axis displacement magnitude. In the process of collecting stacking images, one bright field image and one encoded light illumination image will be collected under the current value of each liquid lens (equivalent to the position of each z-axis), so that the bright field image and the encoded light illumination image have a one-to-one correspondence relationship, and the defocusing amount of the bright field image is equal to the defocusing amount of the corresponding encoded illumination image. As shown in FIG. 3, after acquiring stacking images of one field of view (comprising a series of bright field images 100 and a series of encoded light illumination images 200), the brenner gradient numerical value of each bright field image 100 is calculated, and a quadratic equation 300 is fitted by using the reciprocal of the brenner gradient at a position close to the quasi-focal point. The extreme point of the quadratic equation 300 (also being an axis of symmetry of the quadratic equation 300) is the quasi-focal position; therefore, the defocusing amount corresponding to each encoded light illumination image can be obtained by calculating the brenner gradient parameter from the bright field image. By adjusting the current of the liquid lens, one bright field image and an encoded light illumination image are collected every 0.5 μm step length within the range of ±20 μm (equivalent by calibration) of the quasi-focal position of the sample to obtain a training label 400 of convolutional neural network 500.

Specifically, step S2 includes the following steps:

S21: calibrating an optical system of an encoded illumination real-time focusing scanning imaging device to obtain a proportional relationship between a current value change of a liquid lens and a z-axis displacement, wherein the z-axis direction refers to the direction of an optical path;

under a certain spatial position of a sample, fixing the Δz-axis of an objective lens at a certain position, and adjusting the current value of the liquid lens to acquire a stacking image so that the system is at an optimal quasi-focal position; and then moving the objective lens Δz in the z-axis direction, wherein at this moment the system is not in a quasi-focal position, then adjusting the current of the liquid lens to make the system be in the optimal quasi-focal position again so as to obtain the current change ΔI in this process, and repeating this process to acquire the average value of ΔI/Δz as the proportional relationship between the current value change of the liquid lens and the z-axis displacement;

S22: shooting a bright field image and an encoded light illumination image;

moving the object stage to align the objective lens with a certain spatial position of the sample, acquiring stacking image at the spatial position by continuously adjusting the current of the liquid lens at a fixed step length (for example, 0.5 μm), and shooting one bright field image and one encoded light illumination image at each current value, wherein the bright field image and the encoded light illumination image have a one-to-one corresponding relationship;

S23: calculating the defocusing amount of the bright field image;

calculating the brenner gradient of each bright field image in the stacking image, determining a quasi-focal position by fitting a quadratic function with the reciprocal of the brenner gradient, and after determining the quasi-focal position, combining with the liquid lens adjusting the step length so that the defocusing amount of each bright field image can be obtained;

S24: selecting training set data; selecting an image within an equivalent ±20 μm defocusing amount range near the quasi-focal point as the training set data; wherein in step S23, the defocusing amount of each bright field image is calculated, and since there is a one-to-one correspondence between the bright field image and the encoded light illumination image, the actual defocusing amount of each encoded light illumination image is obtained.

S3: network training.

A parameter of a neural network is trained by taking the encoded light illumination image within an equivalent ±20 µm defocusing amount range near the quasi-focal point and the corresponding defocusing amount as the input and output of the convolutional neural network (CNN), respectively.

S4: whole slide image acquisition, after training a network model, apply the network model to an image acquisition process, specifically comprising the following steps:

S41: moving the sample to a certain spatial position;

S42: irradiating the sample with encoded light, and shooting one encoded light illumination image;

S43: inputting the encoded light illumination image into the convolutional neural network to obtain a corresponding defocusing amount;

S44: combining with the corresponding defocusing amount and the proportional relationship between the current value change of the liquid lens and the z-axis displacement to obtain the current value of the liquid lens required to be adjusted, so that the system is in a quasi-focal state;

S45: using bright field image illumination to shoot a bright field image of a quasi-focal sample; and S46: controlling the object stage to move the sample to the next field of view position, and repeating steps S41-S45 until all the images of the field of view are acquired, and then stitching the bright field images into one whole slide high-resolution image.

The encoded illumination real-time focusing scanning imaging device proposed in preferred embodiments of the present invention includes an LED array and a liquid lens, wherein bright field light or encoded light is emitted through the LED array so as to respectively capture a bright field image or an encoded light illumination image, and wherein the captured encoded light illumination image can be used for training a convolutional neural network; further combining with a liquid lens with a fast adjustment capability, multiple groups of bright field images and encoded light illumination images can be conveniently acquired, and the defocusing amount of the bright field image is correspondingly calculated so as to acquire the training data of the convolutional neural network; through the trained convolutional neural network, the defocusing amount of the encoded illumination image shot by the encoded illumination real-time focusing scanning imaging device can be quickly obtained, so that the liquid lens can be quickly adjusted according to the defocusing amount to obtain the quasi-focal bright field image, and finally obtain the whole slide high-resolution image. In summary, the present invention, by using encoded light illumination, enables the obtained encoded light illumination image to contain the information about the defocusing amount, and uses depth learning to calculate the defocusing amount, and uses a liquid lens to accelerate the focusing speed during the image acquisition process, thereby greatly improving the acquisition speed of a whole slide pathological image, and achieving low-cost fast and accurate focusing.

Those skilled in the art should understand that embodiments of the invention may be provided as a method, system, or computer program product. Accordingly, the present invention may take the form of an entire hardware embodiment, an entire software embodiment, or an embodiment combining software and hardware aspects. Furthermore, the present invention may take the form of a computer program product implemented on one or more computer-usable storage media (including, but not limited to, magnetic disk storage, CD-ROM, optical storage, etc.) having a computer-usable program code included therein.

The present invention is described with reference to a flowchart and/or a block diagram of a method, equipment (system), and a computer program product according to the embodiments of the present invention. It should be understood that each flow and/or block of the flowchart and/or block diagram, and combinations of flows and/or blocks in the flowchart and/or block diagram, can be implemented by a computer program instruction. These computer program instructions may be provided to a processor of a general-purpose computer, a special-purpose computer, an embedded processor, or other programmable data processing equipment to produce one machine, such that an instruction, executed via the processor of the computer or other programmable data processing equipment, creates a device for implementing the functions specified in one or more flows in the flow diagram and/or one or more blocks in the block diagram.

These computer program instructions may also be stored in a computer-readable memory that can guide a computer or other programmable data processing equipment to work in a particular manner, such that the instructions stored in the computer-readable memory produce an article of manufacture including an instruction device, which implements the functions specified in one or more flows in the flow diagram and/or one or more blocks in the block diagram.

These computer program instructions may also be loaded onto a computer or other programmable data processing equipment to cause a series of operational steps to be executed on the computer or other programmable equipment to produce a computer-implemented process such that the instructions executed on the computer or other programmable equipment provide steps for implementing the functions specified in one or more flows in the flow diagram and/or one or more blocks in the block diagram.

The background section of the present invention may contain background information about the problems or environments of the present invention, not necessarily describing the prior art. Therefore, what is contained in the background section is not an admission by the applicant of the prior art.

The above content is a further detailed description of the present invention in combination with specific preferred implementation modes. It cannot be determined that the specific implementation of the invention is limited to these descriptions. For those skilled in the technical field to which the present invention belongs, without departing from the concept of the present invention, several equivalent replacements or obvious variants can be made, and all of them have the same performance or use and should be considered as belonging to the protection scope of the present invention. In the illustration of the description, the reference to the terms "an embodiment", "some embodiments", "preferred embodiment", "example", "specific example", or "some examples", etc. means that the specific features, structures, materials, or features described in connection with the embodiment or example are included in at least one embodiment or example of the invention. In the description, schematic representations of the above terms do not necessarily refer to the same embodiment or example. Furthermore, the specific features, structures, materials, or characteristics described may be combined in any suitable manner in any one or more embodiments or examples. Without contradicting each other, those skilled in the art can incorporate and combine different embodiments or examples described in this description and the features of different embodiments or examples. Although embodiments of the present invention and their advantages have been described in detail, it should be understood that various changes, substitutions, and alterations can be made herein without departing from the scope of the patent application.

The invention claimed is:

1. An encoded illumination real-time focusing scanning imaging method, comprising steps below:
    S1: setting up an encoded illumination real-time focusing scanning imaging device, the encoded illumination real-time focusing scanning imaging device comprising an LED array, an object stage, an objective lens, a liquid lens, a lens sleeve, and a camera, wherein the LED array is located on one side of the object stage, the objective lens, the liquid lens, the lens sleeve, and the camera are located on the other side of the object stage, the object stage is used for placing a sample, the LED array is used for emitting bright field light or encoded light, and the bright field light or the encoded light respectively penetrates through the sample and then successively passes through the objective lens, the liquid lens, and the lens sleeve to reach the camera to shoot a bright field image or an encoded light illumination image by the camera, the encoded light being obtained by two LEDs located on two sides of the sample on the LED array respectively emitting light of different wavelengths and the other LEDs not emitting light;
    S2: placing a sample to be tested on the object stage so that the objective lens aligns with any spatial position of the sample, adjusting a current of the liquid lens at the spatial position with a predetermined step length, respectively shooting the bright field image and the encoded light illumination image under each current value, and calculating a defocusing amount of each bright field image so as to obtain a corresponding defocusing amount of each encoded light illumination image;
    S3 taking multiple encoded light illumination images and corresponding defocusing amounts as an input and an output of a convolutional neural network respectively so as to train the convolutional neural network; and
    S4: shooting the encoded light illumination image, inputting the same to a trained convolutional neural network so as to obtain the corresponding defocusing amount, and adjusting the current of the liquid lens according to the corresponding defocusing amount so as to shoot and obtain a quasi-focal bright field image.

2. The encoded illumination real-time focusing scanning imaging method according to claim 1, wherein the bright field light is obtained by emitting white light through all LEDs on the LED array.

3. The encoded illumination real-time focusing scanning imaging method according to claim 1, wherein in step S2, prior to shooting a bright field image and an encoded light illumination image, the encoded illumination real-time focusing scanning imaging device is calibrated to obtain a proportional relationship between a current value change of the liquid lens and a z-axis displacement.

4. The encoded illumination real-time focusing scanning imaging method according to claim 3, wherein the calculating the defocusing amount of each bright field image specifically comprises:

calculating a brenner gradient of each bright field image, determining a quasi-focal position by fitting a quadratic function with a reciprocal of brenner gradient, and combining the quasi-focal position and the proportional relationship between the current value change of the liquid lens and the z-axis displacement to calculate the defocusing amount of each bright field image.

5. The encoded illumination real-time focusing scanning imaging method according to claim 1, wherein in step S2, a predetermined step length is 0.5 μm.

6. The encoded illumination real-time focusing scanning imaging method according to claim 1, wherein in step S3, the encoded light illumination image within a defocusing amount range of ±20 μm near a quasi-focal point and a corresponding defocusing amount are specifically selected as the input and the output of the convolutional neural network, respectively.

7. The encoded illumination real-time focusing scanning imaging method according to claim 1, wherein step S4 specifically comprises:
    S41: placing the sample to be tested on the object stage such that the objective lens is aligned with a spatial position of the sample;
    S42: the LED array emitting encoded light to shoot the encoded light illumination image;
    S43: inputting the encoded light illumination image shot in step S42 into the trained convolutional neural network so as to obtain the corresponding defocusing amount;
    S44: adjusting the current of the liquid lens according to the corresponding defocusing amount so that an optical path system of the encoded illumination real-time focusing scanning imaging device is in a quasi-focal position;
    S45: the LED array emitting bright field light so as to shoot and obtain the bright field image of the quasi-focal position; and
    S46: controlling the object stage so that the objective lens is aligned with a next spatial position of the sample, and repeating steps S41-S45 until images of all spatial positions of the sample are acquired, and then all bright field images are spliced into a whole slide image.

8. An encoded illumination real-time focusing scanning imaging system, comprising:
    an encoded illumination real-time focusing scanning imaging device, the encoded illumination real-time focusing scanning imaging device comprising an LED array, an object stage, an objective lens, a liquid lens, a lens sleeve, and a camera, wherein the LED array is located on one side of the object stage, the objective lens, the liquid lens, the lens sleeve, and the camera are located on the other side of the object stage, the object stage is used for placing a sample, the LED array is used for emitting bright field light or encoded light, and the bright field light or the encoded light respectively penetrates through the sample and then successively passes through the objective lens, the liquid lens, and the lens sleeve to reach the camera to shoot a bright field image or an encoded light illumination image by the camera, the encoded light being obtained by two LEDs located on two sides of the sample on the LED array respectively emitting light of different wavelengths and the other LEDs not emitting light; wherein a sample to be tested is placed on the object stage such that the objective lens is aligned with any spatial position of the sample;

and a processor for executing a computer-readable instruction that, when executed by the processor, executes steps below:

adjusting a current of the liquid lens at the spatial position with a predetermined step length, respectively shooting the bright field image and the encoded light illumination image under each current value, and calculating a defocusing amount of each bright field image so as to obtain a corresponding defocusing amount of each encoded light illumination image;

taking multiple encoded light illumination images and corresponding defocusing amounts as an input and an output of a convolutional neural network respectively so as to train the convolutional neural network; and inputting a shot encoded light illumination image to a trained convolutional neural network so as to obtain the corresponding defocusing amount, and adjusting the current of the liquid lens according to the corresponding defocusing amount so as to shoot and obtain a quasi-focal bright field image.

* * * * *